(12) United States Patent
Müller et al.

(10) Patent No.: US 7,604,857 B2
(45) Date of Patent: Oct. 20, 2009

(54) FIRED REFRACTORY SHAPED PART

(75) Inventors: Mira Müller, Edling/Gai (AT); Martin Wiesel, Trofaiach (AT)

(73) Assignee: Refractory Intellectual Property GmbH & Co. KG, Vienna (AT)

( * ) Notice: Subject to any disclaimer, the term of this patent is extended or adjusted under 35 U.S.C. 154(b) by 651 days.

(21) Appl. No.: 10/595,517

(22) PCT Filed: Jun. 2, 2005

(86) PCT No.: PCT/EP2005/005916

§ 371 (c)(1),
(2), (4) Date: Apr. 25, 2006

(87) PCT Pub. No.: WO2005/123303

PCT Pub. Date: Dec. 29, 2005

(65) Prior Publication Data

US 2009/0011215 A1    Jan. 8, 2009

(30) Foreign Application Priority Data

Jun. 17, 2004   (DE) .................. 10 2004 029 389

(51) Int. Cl.
*B32B 3/26* (2006.01)

(52) U.S. Cl. ............. 428/307.3; 428/304.4; 428/312.2; 428/315.5; 428/319.1; 428/688; 428/702

(58) Field of Classification Search .............. None
See application file for complete search history.

(56) References Cited

U.S. PATENT DOCUMENTS 4,789,651 A * 12/1988 Sugie et al. .................. 501/103
5,151,201 A    9/1992 Fishler et al.
5,363,995 A    11/1994 Fitch et al.

FOREIGN PATENT DOCUMENTS

| DE | 25 33 862 | 2/1976 |
| DE | 34 28 252 A1 | 2/1985 |
| EP | 0 293 600 A | 12/1988 |

* cited by examiner

*Primary Examiner*—Ling Xu
(74) *Attorney, Agent, or Firm*—Christopher L. Parmelee; Walker & Jocke

(57) ABSTRACT

The invention relates to a fired refractory shaped part whose structure: a) consists of up to at least 75% by weight of a pre-fired refractory secondary material with a grain size of up to 3 mm, and; b) has an open pore volume ranging from 10 to 30% that, after firing, is filled, at least in part, with a carbon-containing material, whereby; c) the carbon content is >3% by weight with regard to the shaped part.

12 Claims, 1 Drawing Sheet

50-times magnified 50-times magnified

FIRED REFRACTORY SHAPED PART

The invention pertains to a fired refractory shaped part.

Refractory shaped parts are used in the form of bricks or other specially shaped components, for example, pipes, drains, nozzles or plates, particularly in the fitting of metallurgical melting pots.

The invention focuses on so-called functional products, i.e., the aforementioned special formats.

For example, high-quality refractory products with, among other things, the properties listed below are required in slide valve systems for the flow control of liquid steel:

- they need to be resistant to aggressive components of the liquid steel and a corresponding slag,
- they need to have an adequate thermal shock resistance in order to prevent the formation of cracks, e.g., during the initial contact with hot steel,
- the plates need to have adequate sliding properties because they are displaced relative to one another. In this context, it needs to be simultaneously ensured that the arrangement is absolutely tight along the plane of the plate (with the exception of the outlet region).

At least the requirements with respect to the resistance to thermal shocks and the resistance to heat apply analogously to so-called free-flow nozzles and other functional products.

For this profile of requirements, the state of the art utilizes materials on the basis of zirconium oxide, i.e., materials on the basis of $ZrO_2$. The manufacture of the products is carried out in accordance with fine-ceramics processing methods, e.g., in order to achieve a high density. The raw materials, for example, baddeleyite, are used in grain size fractions of <0.5 mm and ground to fractions $d_{50}$ of 5 µm and less. After the granulation of the material and the addition of a binder, the respective product is shaped by means of compression, namely under a pressure of, for example, 120-160 MPa. After firing the product in an oxidizing atmosphere, for example, at temperatures between 1600 and 1700° C., an apparent density of approximately 4.7 g/cm$^3$ and an open pore volume of approximately 15% can be achieved. The firing shrinkage lies at about 10%.

The product is subsequently finished by means of a single or multiple impregnation with tar, wherein the open porosity drops to about 4-5 vol. %. Volatile components of the tar escape after the subsequent tempering at approximately 500° C. The overall residual carbon content lies at approximately 1-2 wt. % referred to the shaped part.

Products of this type proved to perform adequately in practical applications. However, one disadvantage is the high firing shrinkage. The high density and the fact that the majority of the open porosity consists of micropores ($d_{50}$ of <3 µm) not only prohibit another more intensive tar impregnation, but are also the cause for an insufficient resistance to thermal shocks.

Consequently, the invention is based on the objective of making available a fired refractory shaped part, particularly for the manufacture of functional products of the initially cited type, in which the aforementioned properties advantageously compliment one another.

Different parameters such as, for example, grain structure, porosity, impregnation characteristics, etc., were investigated in greater detail in systematic tests. During these tests, it was determined that, among other things, one disadvantage of products according to the state of the art is the significant firing shrinkage. This firing shrinkage can be drastically reduced if the basic material for manufacturing the product comprises a pre-fired material that is referred to as secondary material below. This secondary material may be the material described above with reference to the state of the art. According to the invention, the secondary material is crushed to a certain grain size, finished with a binder, e.g., starch, pressed into the desired shape and ultimately fired. The firing shrinkage is drastically reduced due to the utilization of the pre-fired secondary raw material. The porosity after the firing process is simultaneously increased because additional pore volume is created between the grains of the secondary raw material. These pores are significantly larger than the pores within the individual grains (the secondary basic material) such that the subsequent tar impregnation is simplified and much more carbon can be infiltrated into the shaped part.

In its most basic form, the invention therefore pertains to a fired refractory shaped part, the structure of which

- comprises at least 75 wt. % of a pre-fired refractory secondary material with a grain size up to 3 mm and
- has a pore volume between 10 and 30% that, after firing of the shaped part, was at least partially filled with a material containing carbon, wherein
- the carbon content, referred to the shaped part, amounts to >3 wt. %.

According to embodiments of the invention, the content of the refractory secondary material may exceed 80, 85, 90 or even 95 wt. %, wherein the grain size may also be chosen <2 mm or <1 mm. According to one embodiment, a grain size $d_{50}$ between 0.4 and 0.6 mm is used. Accordingly, the content of other components (that do not include the carbon containing filler) lies at <5, <10, <15, <20 or <25 wt. %, for example, at a minimum content of 3, 5, 8, 10, 15 or 20 wt. %.

While the individual grain (according to the state of the art) has a porosity, for example, of 10 or 15 vol. %, the second firing results in a significantly higher open pore volume due to the creation of interstices (free spaces) between the individual grains of the secondary material. For example, at least 50% of the pores have a diameter of >6 µm while the majority of the pores according to the state of the art have a diameter of <3 µm. According to the invention, the pores may also have a diameter of 10 µm and more.

According to one embodiment, the lower limit for the open pore volume (after the firing, but before the impregnating) amounts to 15% or 20% instead of 10%.

The shaped part may be subjected to a single or multiple impregnation with a material containing carbon, for example, tar, pitch or the like. Due to the increased pore volume and the pores of larger diameter, the residual carbon content of the impregnated and subsequently tempered component can be adjusted to values of >5 wt. %.

According to one embodiment, the pre-fired refractory secondary material comprises at least 90 wt. % $ZrO_2$. In this respect, it is possible to utilize pure zirconium oxide or zirconium dioxide that was stabilized or partially stabilized, for example, by means of MgO and/or CaO. Suitable raw materials can be found in Schulle: "Refractory Materials," 1. Edition, 1990, pp. 221-223 (ISBN 3-342-00306-5). One suitable secondary material is a recycled material, for example, production waste or used material. It is also possible to utilize a secondary material in the form of a material that was molten, solidified and then crushed.

After the impregnation of the shaped part with the material containing carbon and the subsequent tempering of the shaped part, the remaining porosity lies, according to one embodiment, between 4.5 and 7.5 vol. %.

In addition to the secondary raw material that, according to the invention, amounts to at least 75 wt. %, up to 25 wt. % of other refractory components can be analogously added to the batch, for example, primary materials of analogous mineralogical or chemical composition, i.e., baddeleyite or the like. It is preferred to utilize this primary material in fine-grained form such that it can simultaneously serve for partially filling out the interstices between the coarser grains of the secondary raw material.

The invention is described in greater detail below with reference to two application examples:

1. EXAMPLE 85 wt. % pre-fired $ZrO_2$ with a grain size of <1 mm were mixed with 15 wt. % baddeleyite (not pre-fired) with a grain size of <1 mm and starch (as binder) and subsequently compressed into a shaped body under a pressure of 130 MPa.

After a drying phase, the shaped body was fired at 1640° C. in an oxidizing atmosphere. Subsequently, the shaped body had an apparent density of approximately 4.2 $g/cm^3$ and a porosity of 25 vol. %. The firing shrinkage amounted to 1.5 wt. %.

After the firing process, the shaped part was impregnated with tar and tempered at 500° C. This tar impregnation as well as the subsequent tempering were then repeated. It was determined that the residual carbon content amounted to 5.5 wt. % referred to the shaped part.

Although the cold-bending and the hot-bending strength of the shaped part is lower than that of the initially mentioned product according to the state of the art (that is manufactured exclusively of primary raw materials), but the drastically reduced firing shrinkage (only about 1.0%), as well as the significantly improved resistance to infiltration and an adequate resistance to thermal shocks, are of much greater importance for the cited applications as slide valve plates or free-flow nozzles.

2. EXAMPLE

Baddeleyite was molten and subsequently cooled. The thusly formed "fused block" was then crushed to a grain size of 0.2-3 mm. The granular secondary material replaced one-half of the secondary material used in Example 1. The test values were chosen analogously.

BRIEF DESCRIPTION OF THE DRAWINGS

The differences between the state of the art and the invention are also illustrated in the enclosed micrographs.

Figure 1:
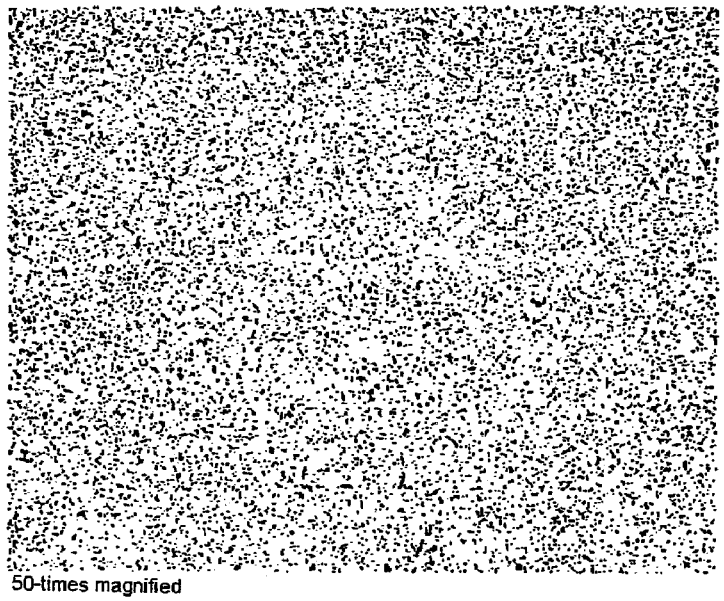
FIG. 1 shows a largely homogenous structure with extremely fine and finely distributed porosity.
Figure 2:
FIG. 2 shows the product according to the invention. One can clearly distinguish the coarse grains of the secondary raw material and the coarser pores next to the grain surfaces that are filled with the carbon containing material.

The differences between the state of the art and the invention can also be expressed in the form of the respective pore size distribution (in this case determined by means of a mercury intrusion porosity measurement).

While the secondary raw material as such contains, to a greater or lesser extent, only pores with a diameter of <3 μm (more than 50% of the pores always have a diameter of <3 μm), the pore size distribution in a twice-fired product according to the invention shifts to significantly greater pore diameters, particularly values of >10 μm.

If the pore diameter is plotted (logarithmically) as a function of the pore distribution or the relative open porosity (respectively in %), the resulting pore size distribution of a product according to the invention shows a first maximum around approximately 3 μm and a second maximum around approximately 10 μm. The second maximum results from the additional processing of the fired secondary raw material and the second firing process.

Generally speaking, a first maximum results for pore diameters below 5 μm and the second maximum results for pore diameters in excess of 8 μm.

The characteristic values or measuring data cited in this application respectively refer to the following norms and standards:

| | |
|---|---|
| Apparent density and porosity: | DIN EN 993-1 |
| Bending strength: | DIN EN 993-6, 7 |
| Grain size distribution (coarser than about 100 μm): | DIN ISO 3310 |
| Grain size distribution (finer than 100 μm): | DIN ISO 13320 |
| Thermal expansion (firing shrinkage): | DIN 51045 |
| Residual carbon content: | ASTM C 831-93 |
| Pore size distribution: | DIN 66133 |

The invention claimed is:

1. A fired refractory shaped part, the structure of which
   a) comprises at least 75 wt. % of a pre-fired refractory secondary material with a grain size up to 3 mm and
   b) has a pore volume between 10 and 30% that, after firing of the shaped part, was at least partially filled with a carbon containing material,
   c) the pore distribution of which is such that at least two maximums result if pore diameters are plotted (logarithmically) as a function of relative open porosity or pore distribution, wherein
   d) the carbon content, referred to the shaped part, amounts to >3 wt. %.

2. The shaped part according to claim 1, the secondary material of which is present in a grain size fraction $d_{50}$ of <1 mm.

3. The shaped part according to claim 1 with an open pore volume between 20 and 30% before the filling with a material containing carbon.

4. The shaped part according to claim 1, the carbon content of which amounts to >5 wt. %.

5. The shaped part according to claim 1, the secondary material of which comprises at least 90 wt. % $ZrO_2$.

6. The shaped part according to claim 1, the secondary material of which comprises of stabilized, partially stabilized, pseudo-stabilized $ZrO_2$ or mixtures thereof.

7. The shaped part according to claim 1 with an open porosity between 4.5 and 7.5 vol. % after the carbon containing material was filled into the pore volume and a subsequent tempering process being performed.

8. The shaped part according to claim 1, the structure of which comprises 5-25 wt. % of a refractory primary material.

9. The shaped part according to claim 8, the primary material of which corresponds to the secondary material mineralogically, chemically or mineralogically and chemically.

10. The shaped part according to claim 8 or 9, the primary material of which is present in a grain size fraction of <0.3 mm.

11. The shaped part according to claim 1, the secondary material of which is a recycled material.

12. The shaped part according to claim 1, wherein a first maximum lies below 5 μm and a second maximum lies above 8 μm.

* * * * *